United States Patent
Saito et al.

[11] Patent Number: 6,120,583
[45] Date of Patent: Sep. 19, 2000

[54] EXHAUST GAS PURIFIER AND OPERATING METHOD THEREOF

[75] Inventors: Hidetoshi Saito; Kenji Matsunuma, both of Itami, Japan

[73] Assignee: Sumitomo Electric Industries, Ltd., Osaka, Japan

[21] Appl. No.: 09/190,169

[22] Filed: Nov. 12, 1998

[30] Foreign Application Priority Data

Dec. 19, 1997 [JP] Japan ................................. 9-350272

[51] Int. Cl.[7] ........................... B01D 29/52; B01D 29/62
[52] U.S. Cl. ................. 95/278; 95/283; 55/283; 55/282.3; 55/287; 55/288; 55/484; 55/DIG. 10; 55/DIG. 30; 60/303; 60/311
[58] Field of Search ................ 55/283, 284, 286, 55/287, 288, 282.3, DIG. 10, DIG. 30, 484; 60/303, 311; 95/278, 283

[56] References Cited

U.S. PATENT DOCUMENTS

| | | |
|---|---|---|
| 4,709,549 | 12/1987 | Lepperhoff ................. 55/DIG. 30 |
| 4,848,083 | 7/1989 | Goerlich . |
| 5,486,220 | 1/1996 | Honda et al. . |
| 5,651,248 | 7/1997 | Kawamura . |

FOREIGN PATENT DOCUMENTS

| | | |
|---|---|---|
| 0 454 346 A1 | 10/1991 | European Pat. Off. . |
| 0 052 826 A1 | 7/1994 | European Pat. Off. . |
| 0 606 071 A1 | 7/1994 | European Pat. Off. . |
| 56-92318 | 7/1981 | Japan ................. 55/DIG. 30 |
| 57-165616 | 10/1982 | Japan ......................... 60/311 |
| 63-306218 | 12/1988 | Japan . |
| 5-321637 | 12/1993 | Japan . |
| 6-330733 | 11/1994 | Japan . |

*Primary Examiner*—David A. Simmons
*Assistant Examiner*—Robert A. Hopkins
*Attorney, Agent, or Firm*—McDermott, Will & Emery

[57] ABSTRACT

An exhaust gas purifier, having three or more filter units parallel, wherein if at least one filter unit fails during its generation, it is compensated by the cyclic operation of the maining filter units so that the total function of the exhaust gas purifier is practically maintained. Electric heaters 14 are provided for regenerating individual filter units 3, and valves 4 are placed either at the entrances or at the exits of the units 3. While filter units 3 with opened valves 4 trap particulates, at least one filter unit 3's valve 4 is closed to send an electric current into the heater 14 for regenerating the filter unit 3. If the detected current is beyond a predetermined range, the current supply is shut off with the valve 4 still kept closed, and another filter unit 3 is regenerated in the same manner.

3 Claims, 4 Drawing Sheets

EXHAUST GAS PURIFIER AND OPERATING METHOD THEREOF

BACKGROUND OF THE INVENTION

The present invention relates to an exhaust gas purifier for removing detrimental particulates included in exhaust gases from engines used in vehicles or industries, and also relates to the operating method of the purifier.

It is known that exhaust gases particularly from diesel engines contain particulate matters, hereinafter called PMs, and that contribute to air pollution. There are two methods for eliminating PMs; one is to suppress the production of PMs by improving engines, and the other is to remove produced PMs mechanically. Belonging to the second category, the invention employs filters to trap PMs. Collected PMs are burnt to regenerate the filters. This PM-trapping-and-burning process is repeated to maintain a continuous purifying operation.

A typical example of prior art is stated in unexamined published Japanese patent application Tokukaisho 63-306218. This equipment has four filters in parallel. While at least one filter is under regeneration, the remaining filters operate to trap PMs. FIG. 6 shows a schematic plan view of this equipment.

As shown in FIG. 6, engine 103 has exhaust pipe 102, which is branched by exhaust manifolds 105 and 106. Filters 108, 109, 110, and 111 are placed at the ends of the manifolds, through valve 112 or 113. In FIG. 6, the flow of exhaust gas into filter 109 is shut off by the operation of valve 112 to cause gas burner 118, fed with oxygen through bypass 120, to eject a high-temperature gas into filter 109 to regenerate it, while the other filters 108, 110, and 111 trap PMs.

Another example in said Tokukaisho 63-306218 has three valves and one burner with four filters in parallel, where even if one filter fails to function, the remaining three filters can maintain the purifying of exhaust gases, according to the patent application.

SUMMARY OF THE INVENTION

With the constitution of FIG. 6, if burner 118 or 119 fails to function, the linked filters cannot be regenerated. When a purifier is equipped with only one burner, malfunction of the burner means total loss of regeneration of the four filter units.

In order to remove the above-mentioned drawbacks and to enhance operation reliability, the present invention discloses novel equipment and the operation method thereof in a system where each filter is coupled with its own electric heater for burning PMs. In the invention, three or more filter units, each of which has the heater, are placed in parallel, and even if at least one filter unit fails to function during its regeneration, this malfunction is compensated by the cyclic operation of the remaining filter units so that the total function of the exhaust gas purifier is practically maintained.

Having three or more filter units placed in parallel at any downstream positions of the exhaust manifolds of an engine, an exhaust gas purifier of the invention is equipped with electric heaters for regeneration of individual filter units, means of current detection for these heaters, and valves either at the entrances or exits of the filter units.

Interchangeable filter units enable the easy maintenance because faulty parts and filter units are easily replaceable by a simple inventory control.

The purifying operation of exhaust gases by the equipment is carried out by shifting valves to be opened or closed in rotation. During the operation of trapping PMs by filter units with opened valves, at least one filter unit discontinues this operation by closing the valve thereof to send an electric current into the heater for regenerating the filter unit. If the detected current is beyond a predetermined range, the current supply is shut off with the valve still kept closed, and another filter unit is chosen for regeneration in the same manner. Closing the valve for a faulty filter unit prevents an excessive accumulation of collected PMs that may cause an extreme temperature rise when the heater of the faulty filter unit is supplied with an electric current for subsequent filter regenerations. As the cyclic regeneration proceeds, an electric current is again introduced into the heater of the faulty filter unit. If the current detection is normal, the regeneration of the unit is carried out as usual; if abnormal again, the regeneration is cancelled with the valve still kept closed, and the regeneration for the next unit follows. The regeneration of the failed unit is discontinued in the following cycles of regeneration to save electricity consumption.

When the number of filter units having an abnormal heater current reaches a predetermined limit, all the valves including those having been closed so far may be opened to cause all the filter units to trap PMs. This can suppress the increase in pressure loss in the filter units and thus prevent the drop in the engine output. And at the same time, an alarm may sound to let the driver recognize the faulty conditions of the total exhaust gas purifier and allow the driver to take prompt actions for reconditioning.

The present invention discloses a novel equipment and the operation method thereof for an exhaust gas purifier where three or more filter units are placed in parallel; more specifically, even if at least one filter unit fails to function during its regeneration, through the cognizance of the history and number of failed filter units, this malfunction is compensated by the cyclic operation of the remaining filter units so that the total function of the exhaust gas purifier is practically maintained.

Interchangeable filter units with identical structure and size enable easy maintenance because faulty parts and filter units are easily replaceable by a simple inventory control.

In a disclosed system of the invention where each individual filter unit has its own electric heater for regenerating the filter, even if some electric heaters nevertheless fail to function, the remaining filter units can sustain the operation of trapping PMs and regenerating filters or sounding an alarm to alert the driver to the problem in the total exhaust gas purifier, depending on the number of faulty filter units.

DETAILED DESCRIPTION OF THE INVENTION

Figure 1:
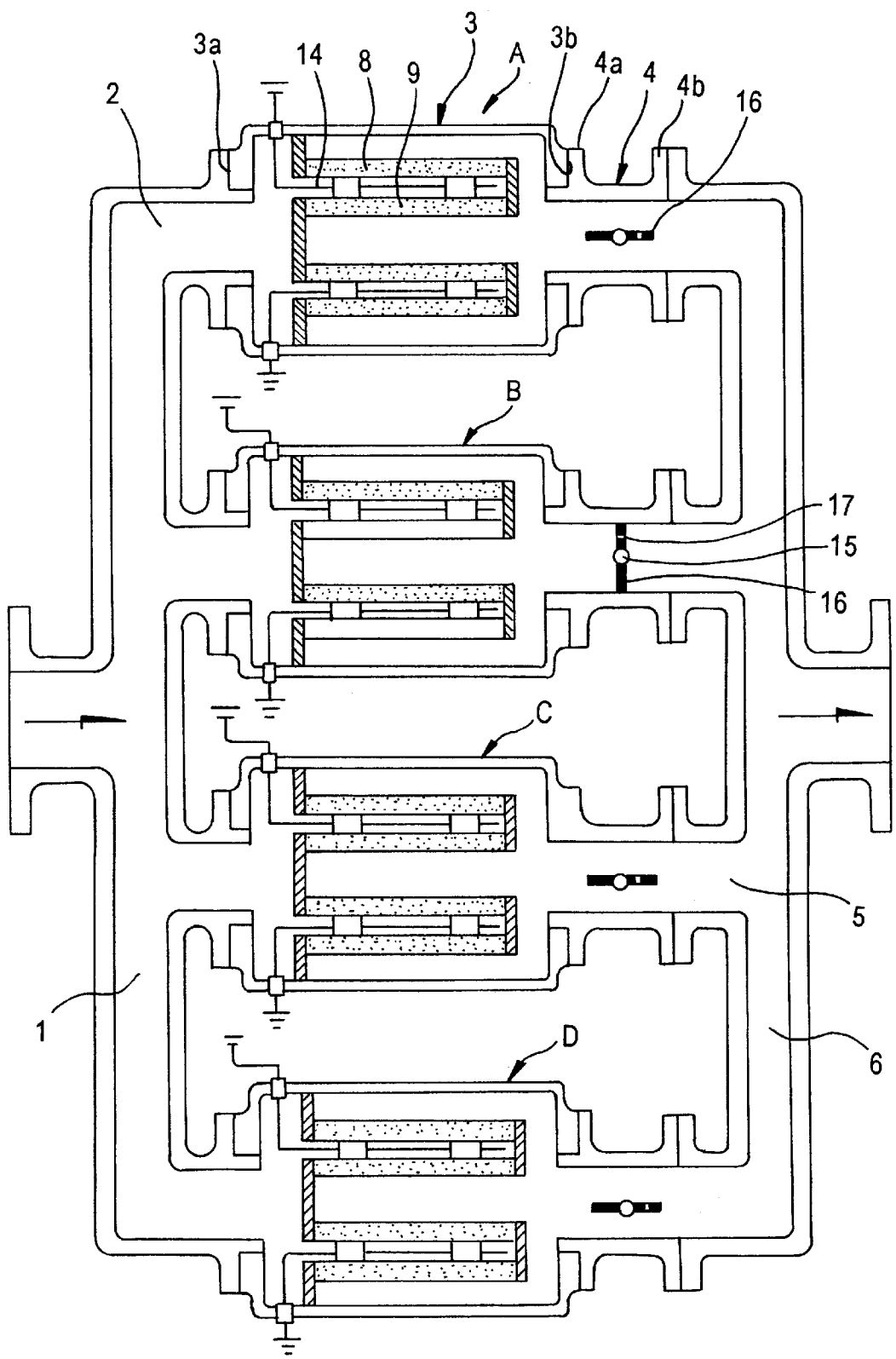
FIG. 1 is a plan view showing an outline of the exhaust gas purifier of the invention.

A desirable embodiment of the invention is delineated in detail below using the drawing attached:

FIG. 1 is a plan view showing an outline of the exhaust gas purifier of the invention where four filter units are placed in parallel at any downstream positions of the exhaust manifolds. Although placed on the same plane in FIG. 1 for the ease of explanation, the filter units should be disposed in three dimensions to save space in actual application.

As shown in FIG. 1, exhaust gases run through inlet pipe 1, diverge at inlet manifolds 2, and reach widely-known filter units 3 placed in parallel to A through D. The gases proceed to valves 4 fitted at the exits of individual filter units 3, converge at the ends of outlet manifolds 5, and finally flow through outlet pipe 6 to the outside.

It is desirable that the four filter units 3 and four valves 4 for A to D be identical because interchangeability facilitates simple maintenance work by unit-by-unit control of spare parts and filter units. A filter unit 3 may be replaced by disconnecting from the inlet manifold 2 at the coupling 3a and from the valve 4 at the coupling 3b. A valve 4 may likewise be replaced by disconnecting from the filter unit 3 at the flange 4a and from the outlet manifold 5 at the flange 4b.

Figure 2:
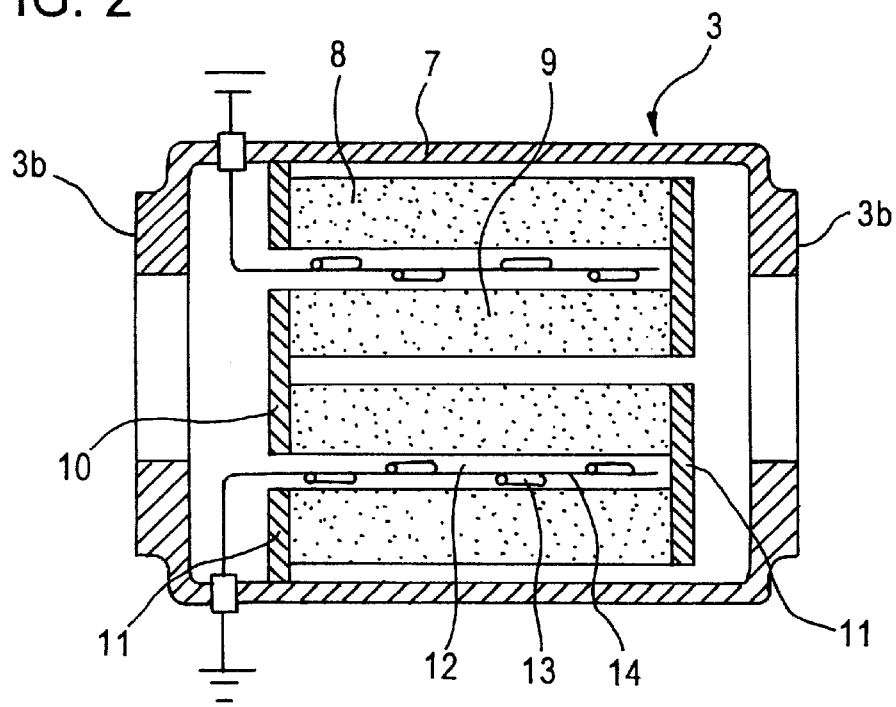
FIG. 2 is a sectional view of the filter unit of the invention.

FIG. 2 is a sectional view of the filter unit 3 employed in the invention. Filter casing 7 supports multiple cylindrical porous-metal filters 8 and 9 through end plate 10 and fixing plates 11. In a ring space 12 between the filters 8 and 9, insulators 13 support an electric heater of cylindrically-wound thin heater element 14. Heating by electric heater 14 enables the regenerating of the multiple cylindrical filters 8 and 9.

Although shown as a butterfly type in FIG. 1 for the ease of illustration, the valve 4 may take any form as long as it secures sealing performance. The valve 4 may be placed between the inlet manifold 2 and the filter unit 3, but in order to prevent the accumulation of PMs in exhaust gases around the spindle 15, it is desirable that the valve 4 be placed between the filter unit 3 and the outlet manifold 5.

When a valve 4 is closed during the regeneration of the coupled filter unit 3, the valve expels burnt gases, produced by fed oxygen in the filter casing 7, through the orifice 17 in the blade 16. The orifice 17 should not be of a size that is large enough to allow the filters to trap PMs in the exhaust gas additionally.

Figure 3:
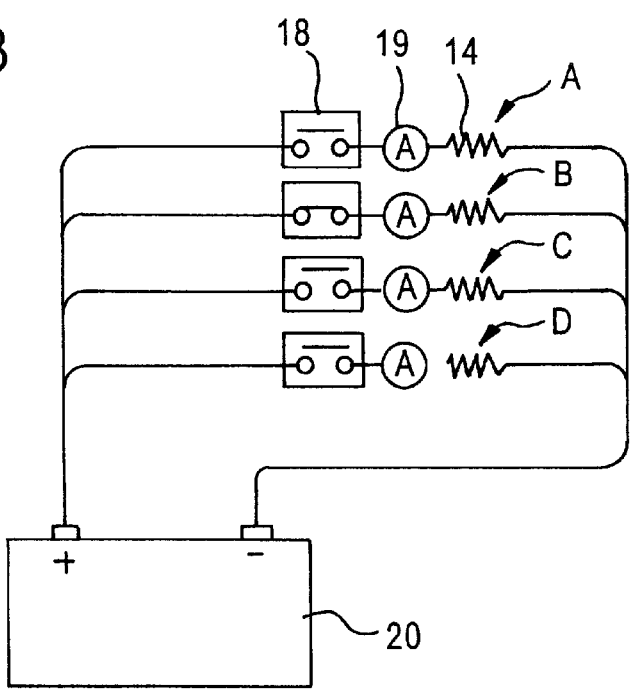
FIG. 3 is a connection diagram in which each electric heater has its own current detector of the invention.

The invention provides current detectors for identifying faulty electric heaters. FIG. 3 is a connection diagram in which each electric heater 14 from A to D has its own current detector 19 and relay contact 18 that switches the battery current to the heater. This arrangement enables easy detection of a faulty heater, and the control circuit may be simplified. If the supply current to an electric heater 14 is greater than a specified upper limit, a short circuit may result; if smaller than a specified lower limit, a disconnection may result. Both cases are judged to be faulty.

Figure 4:
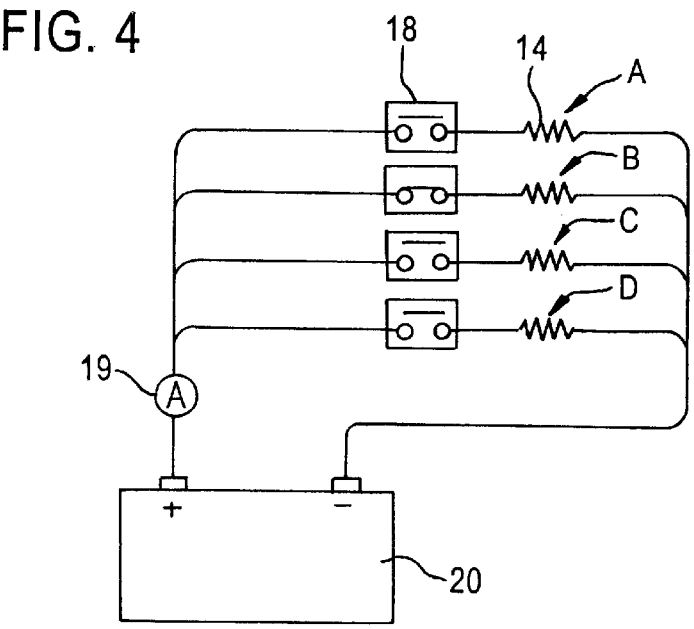
FIG. 4 is a connection diagram in which the electric heaters share a common current detector of the invention.
Figure 6:
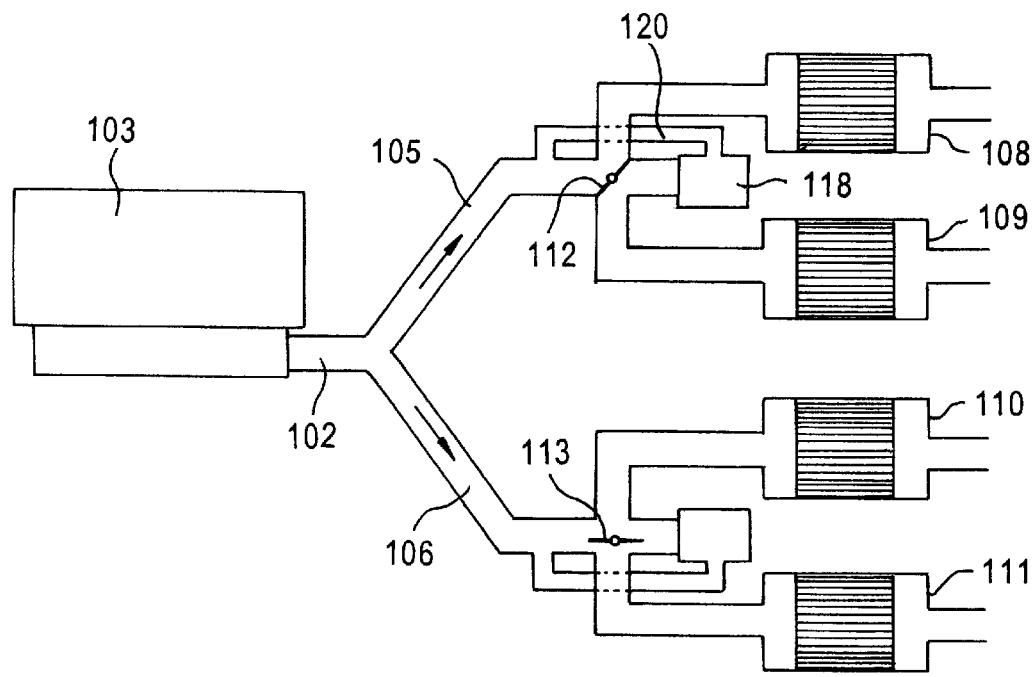
FIG. 6 is a plan view showing an outline of an existing exhaust gas purifier.

FIG. 4 is a connection diagram in which electric heaters 14 share a common current detector 19. In this arrangement, a faulty heater 14 is detected by the signal of a making relay contact 18 and the battery 20's supply current measured by detector 19. This system is economical and saves space since only one current detector 19 is needed.

In the invention, even if at least one filter unit 3 fails to function during the regeneration, this malfunction is compensated by the cyclic operation of the remaining filter units so that the total function of the exhaust gas purifier is practically maintained. Detailed operation of this system is delineated as follows:

The exhaust gas purifier shown in FIG. 1 usually regenerates one filter unit 3 while the remaining three filter units 3 trap PMs. The valves 4 accompanying the PM-trapping filter units 3 receive a signal for opening the valve, air cylinders (not shown) rotate spindles to open blades 16, and porous metal structures in filters 8 and 9 trap PMs.

On the other hand, the valve 4 accompanying the regeneration-waiting filter unit 3 receives a signal for closing the valve, the air cylinder (not shown) rotates the spindle to close the blade 16 for a period set by a timer, and during that period exhaust gases cease to flow and filters cease to trap PMs. Under these conditions, an electric current is supplied to the heater 14 from battery 20 for a period set by a timer to burn accumulated PMs.

When the regeneration is completed and the valve 4 receives a signal to open the valve, burnt gases in the filter casing 7 flow through the outlet manifold 5 and outlet pipe 6 to the outside. And the filters 8 and 9 in the filter unit 3 resume trapping PMs in the exhaust gas. By repeating this procedure for all filter units in rotation, the filter units 3 from A to D are regenerated and the exhaust gas is purified without interruption.

If an electric heater 14, of unit B for instance, has a problem, the current detector 19 identifies an abnormal current; the current supply for the heater 14 is shut off so that the regeneration for unit B is discontinued; and with the valve 4 of unit B kept closed, the regeneration for the next filter unit 3, C for example, is started.

After completing the regeneration for the remaining units D and A, regeneration of unit B is tried again by sending a current to the electric heater 14. If the current is normal, no special action is taken and the regeneration is conducted as usual; after completing the regeneration, the valve 4 of unit B is opened and the regeneration for the next unit C proceeds.

However, if the current is still abnormal, the regeneration for unit B is discontinued entirely. With the valve 4 for unit B kept closed, the regeneration for unit C is started. Thus, an electric heater 14 that produced abnormal currents twice in succession is judged as a true failure. This filter unit having the faulty heater 14 should be excluded from the next and future regeneration cycles, and it is desirable to alert the driver by either an aural signal, such as a buzzer, or a visual signal, such as a warning lamp.

After the detection of a heater 14 showing two consecutive failures, if the heater 14 for another filter unit 3 showed an abnormal current, all the valves including those for faulty filter units 3 should be opened to maintain the pressure loss as low as possible, which means total cessation of regeneration until the reconditioning of the system is fulfilled.

In a system having four filter units 3 as shown in FIG. 1, if the two valves 4 for faulty filter units 3 are closed, the remaining two filter units 3 cannot undergo regeneration, because closing of the valve 4 for a filter unit 3 causes excessive pressure loss in the remaining one filter unit 3. This cannot be tolerated for the total exhaust gas purifier. Therefore, all the valves including those for faulty filter units 3 should be opened, and it is desirable that an alarm be signaled to alert the driver to the faulty conditions so that the driver can take prompt actions for reconditioning.

In a system having five or more filter units 3, a tolerable number of faulty electric heaters 14 that produce two consecutive abnormal currents, in other words, a tolerable number of faulty heaters 14 beyond which all the valves 4 are opened may be determined by pressure loss in a total exhaust gas purifier.

Figure 5:
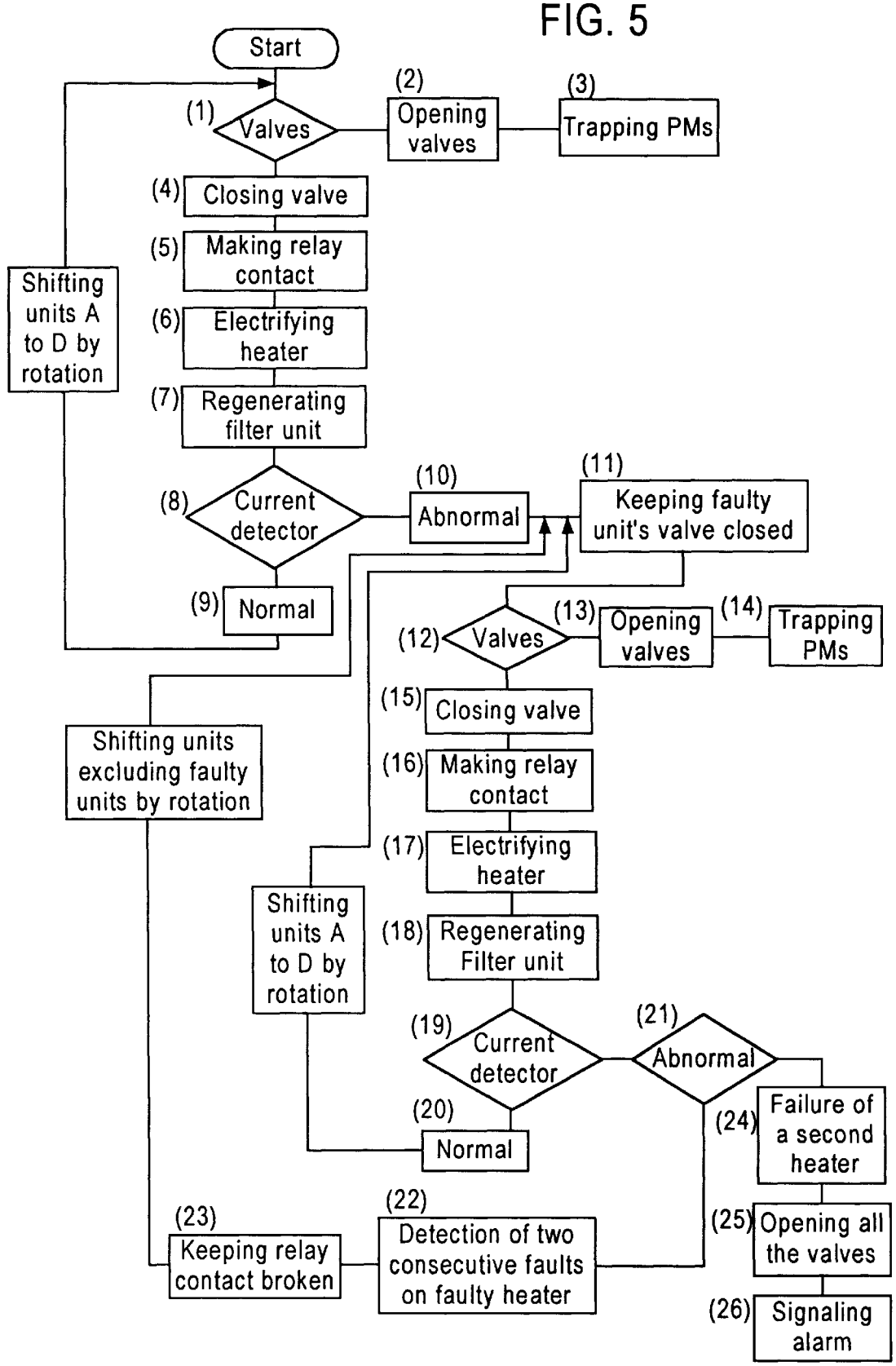
FIG. 5 is a simplified flowchart of the operation method of the exhaust gas purifier of the invention.

When current detectors 19 shown in FIG. 3 are placed in an exhaust gas purifier illustrated in FIG. 1, a series of automatic operations may be performed following the steps in the flowchart shown in FIG. 5.

As a usual procedure, trapping PMs and regenerating filter units 3 are carried out continuously in rotation by the following steps:

(1) Select valves 4 to be opened or closed.

(2) Open three valves.

(3) The three filter units 3 trap PMs.

(4) Close the remaining one valve.

(5) Make the relay contact 18.

(6) Send a current to the electric heater 14.

(7) Regenerate filters 8 and 9 of the filter unit 3.

(8) Measure the current to the heater 14.

(9) When the current is normal, return to step (1) to repeat the process of PM trapping and filter regeneration by shifting filter units 3 in rotation.

(10) If the current is abnormal, proceed to step (11).

(11) Keep the valve 4 closed for the failed filter unit 3.

(12) Select valves 4 to be opened or closed out of the remaining three filter units 3.

(13) Open two valves.

(14) The two filter units 3 trap PMs.

(15) Close the remaining one valve.

(16) Make the relay contact 18.

(17) Send a current to the electric heater 14.

(18) Regenerate filters 8 and 9 of the filter unit 3.

(19) Measure the current to the heater 14.

(20) When the current is normal, return to step (11) to repeat the process of PM trapping and filter regeneration by shifting filter units 3 including the failed one in rotation. If the failed heater shows a normal current, although not shown in the chart, return to step (1).

(21) If the current is abnormal, proceed to step (22) or (24).

(22) If the abnormal current is successively detected on the failed heater, proceed to step (23).

(23) Break the relay contact 18 of the failed heater and keep it broken to exclude the coupled filter unit 3 from future regeneration processes, and return to step (11).

(24) If the abnormal current is detected on a heater 14 other than the failed one, proceed to step (25).

(25) Open the two valves 4 whose coupled heaters are judged as a failure. This means all the valves are opened.

(26) Activate an alarm to alert the driver to the faulty conditions so that the driver can take prompt actions for reconditioning.

What is claimed is:

1. In an exhaust gas purifier having at least three filter units for trapping exhaust gas particulate matter, each filter unit including an electric heater and an associated valve to control exhaust gas flow therethrough, a method comprising the steps of:

closing a valve of a first of said filter units while permitting exhaust gas to flow to at least another of said filter units;

applying current to the electric heater of said first filter unit for a predetermined time period for regeneration thereof;

detecting said current to determine whether said current is in an acceptable range;

opening said valve subsequent to expiration of said predetermined time period;

repeating said steps of closing, applying and detecting successively for each said filter unit; and if the detected current in said detected step for a respective filter unit is not within said acceptable range, terminating application of current to said respective filter unit and maintaining closed the valve of said respective filter unit during the application of said steps of closing, applying and detecting to successive filter units.

2. A method as recited in claim 1, wherein said successive steps of closing, applying, detecting and opening for each said filter unit are performed for each filter unit in sequential order in recurring regeneration cycles for regeneration of the filter units, and further comprising the steps of:

detecting an abnormal current in a first filter unit during a first regeneration cycle and maintaining closed the valve of the first filter unit until the sequential order for the first unit occurs in the next regeneration cycle:

in the next regeneration cycle; and applying current to the first heater unit while the valve is closed for said predetermined time period;

detecting the current applied to the first filter unit and, in response thereto, determining whether the detected current in the first filter unit is normal; and if the first filter unit detected current is normal, opening the valve of the first filter unit and applying said repeating steps to the first filter unit in successive regeneration cycles; and if the first filter detected current is abnormal, terminating application of current to the first filter unit, maintaining the valve of the first filter unit closed, and discontinuing the first filter unit from the sequential order in subsequent regeneration cycles.

3. A method as recited in claim 2, further comprising, in response to detection of abnormal current in a predetermined number of filter units of the exhaust gas purifier during a regeneration cycle, the steps of:

opening the valves of all filter units, including faulty units, for trapping exhaust gas particulate matter; and generating an alarm.

* * * * *